(12) United States Patent
Muruganantham et al.

(10) Patent No.: US 10,493,410 B2
(45) Date of Patent: Dec. 3, 2019

(54) SELECTIVE CATALYTIC REDUCTION WITH INTEGRATED DECOMPOSITION CHAMBER WITH EXHAUST FLOW SWIRL GENERATING DESIGN

(71) Applicant: Cummins Emission Solutions, Inc., Columbus, IN (US)

(72) Inventors: Karthik Muruganantham, Columbus, IN (US); Achuth Munnannur, Madison, WI (US); Deepesh Goyal, Columbus, IN (US); Rahul Suresh, Columbus, IN (US); Santosh Kumar Pradhan, Banpur (IN); Vinay Kumar Joshi, Pune (IN); Ramayodhya Pandit, Pune (IN)

(73) Assignee: Cummins Emission Solutions Inc., Columbus, IN (US)

( * ) Notice: Subject to any disclaimer, the term of this patent is extended or adjusted under 35 U.S.C. 154(b) by 214 days.

(21) Appl. No.: 15/540,910

(22) PCT Filed: Jan. 9, 2015

(86) PCT No.: PCT/US2015/010837
§ 371 (c)(1),
(2) Date: Jun. 29, 2017

(87) PCT Pub. No.: WO2016/111701
PCT Pub. Date: Jul. 14, 2016

(65) Prior Publication Data
US 2017/0354934 A1 Dec. 14, 2017

(51) Int. Cl.
*B01F 3/04* (2006.01)
*F01N 3/20* (2006.01)
(Continued)

(52) U.S. Cl.
CPC ........ *B01F 3/04049* (2013.01); *B01F 5/0461* (2013.01); *F01N 3/10* (2013.01);
(Continued)

(58) Field of Classification Search
CPC ...... B01F 3/04049; B01F 5/0451; F01N 3/10; F01N 3/2892; F01N 3/2066; F01N 13/017; F01N 2610/1453; F01N 2610/02
See application file for complete search history.

(56) References Cited

U.S. PATENT DOCUMENTS 6,722,123 B2  4/2004  Liu et al.
8,079,211 B2  12/2011 Levin et al.
(Continued)

FOREIGN PATENT DOCUMENTS

EP  1 748 162 B1  9/2008
GB  2 448 993 A  11/2008
(Continued)

OTHER PUBLICATIONS

International Search Report and Written Opinion issued for PCT/US2015/010837, dated May 6, 2015, 9 pages.

*Primary Examiner* — Patrick D Maines
(74) *Attorney, Agent, or Firm* — Foley & Lardner LLP

(57) ABSTRACT

A selective catalytic reduction including a decomposition section including an intake chamber, with a swirl generating plate disposed in an internal volume of the intake chamber. The swirl generating plate includes a curved sidewall, a first end defining an opening, and a second end. The curved sidewall is oriented substantially normal to the direction of an intake flow of exhaust gas and a convex surface of the curved sidewall is oriented to face the direction of the intake flow. The swirl generating plate is configured to divide the intake flow into a first flow portion flowing through the opening, a second and a third flow portion which are
(Continued)

directed substantially normal to the direction of intake flow and the flow direction of the first flow portion, and in opposite directions to each other towards a backwall of the intake chamber so as to create opposing swirls.

24 Claims, 11 Drawing Sheets

(51) Int. Cl.
  *F01N 3/28* (2006.01)
  *F01N 13/00* (2010.01)
  *B01F 5/04* (2006.01)
  *F01N 3/10* (2006.01)
  *B01F 5/00* (2006.01)

(52) U.S. Cl.
  CPC ......... *F01N 3/2066* (2013.01); *F01N 3/2892* (2013.01); *F01N 13/017* (2014.06); *B01F 2005/0091* (2013.01); *F01N 2610/02* (2013.01); *F01N 2610/1453* (2013.01); *Y02T 10/24* (2013.01)

(56) References Cited

U.S. PATENT DOCUMENTS

| | | |
|---|---|---|
| 8,114,364 B2 | 2/2012 | Harinath et al. |
| 8,240,137 B2 | 8/2012 | Liu et al. |
| 8,528,319 B2 | 9/2013 | Wilhelm et al. |
| 2007/0101703 A1 | 5/2007 | Kanaya et al. |
| 2010/0107614 A1 | 5/2010 | Levin et al. |
| 2010/0139258 A1 | 6/2010 | Hackett et al. |
| 2010/0196225 A1* | 8/2010 | Harinath ............... F01N 3/2066 422/187 |
| 2010/0212292 A1* | 8/2010 | Rusch .................. F01N 3/2066 60/274 |
| 2011/0030343 A1 | 2/2011 | Kiser et al. |
| 2011/0094206 A1 | 4/2011 | Liu et al. |
| 2011/0099978 A1 | 5/2011 | Davidson et al. |
| 2011/0107743 A1* | 5/2011 | Ranganathan ...... B01F 3/04049 60/295 |
| 2011/0131958 A1 | 6/2011 | Adelman et al. |
| 2011/0146254 A1 | 6/2011 | Yi et al. |
| 2011/0167805 A1 | 7/2011 | Chen |
| 2011/0180347 A1* | 7/2011 | Butler ...................... F01N 1/08 181/274 |
| 2012/0090305 A1* | 4/2012 | Floyd .................. B01F 3/04049 60/303 |
| 2012/0102920 A1 | 5/2012 | Pipis, Jr. |
| 2012/0174561 A1* | 7/2012 | Troxler ................. F01N 3/2066 60/274 |
| 2012/0324872 A1 | 12/2012 | Jaruvatee et al. |
| 2013/0031891 A1 | 2/2013 | Ponnathpur |
| 2013/0061577 A1 | 3/2013 | Floyd et al. |
| 2015/0101318 A1* | 4/2015 | Munnannur .......... F01N 3/2892 60/301 |
| 2016/0006111 A1* | 1/2016 | Miskovsk ................ H01Q 1/36 343/718 |
| 2016/0084133 A1* | 3/2016 | Sampath ............... F01N 3/2066 60/295 |

FOREIGN PATENT DOCUMENTS

| | | |
|---|---|---|
| WO | WO2011/126930 A2 | 10/2011 |
| WO | WO2011/163395 A1 | 12/2011 |
| WO | WO2013/025860 A1 | 2/2013 |

* cited by examiner

SELECTIVE CATALYTIC REDUCTION WITH INTEGRATED DECOMPOSITION CHAMBER WITH EXHAUST FLOW SWIRL GENERATING DESIGN

CROSS-REFERENCE TO RELATED APPLICATIONS

The present application is a National Stage of PCT Application No. PCT/US2015/010837, filed Jan. 9, 2015, which is hereby incorporated by reference in its entirety.

TECHNICAL FIELD

The present disclosure relates generally to exhaust aftertreatment systems for use with internal combustion (IC) engines.

BACKGROUND

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) system to convert $NO_x$ (NO and $NO_2$ in some fraction) into harmless nitrogen gas ($N_2$) and water vapor ($H_2O$) in the presence of ammonia ($NH_3$) and a reducing catalyst. Generally in such conventional SCR aftertreatment systems, ammonia or a source of ammonia is injected into the aftertreatment system and mixed with the exhaust gas to partially reduce the NOx gases. The reduction byproducts of the exhaust gas are then fluidically communicated to the catalyst included in the SCR aftertreatment system to decompose substantially all of the NOx gases into relatively harmless byproducts which are expelled out of such conventional SCR aftertreatment systems.

In conventional selective catalytic reduction systems for aftertreatment of exhaust gas (e.g., diesel exhaust gas) urea is often used as a source of ammonia for reducing NOx gases included in the exhaust gas of IC engines (e.g., diesel exhaust gas). The urea or any other source of ammonia communicated into conventional aftertreatment systems can be deposited on sidewalls and/or components of the aftertreatment exhaust system.

The reasons for incomplete thermolysis of urea include short residence times due to space constraints of the aftertreatment system, low exhaust gas temperatures and impingement of urea or otherwise diesel exhaust fluid particles on solid surfaces. Particularly, the impingement of urea of low temperature walls results in incomplete decomposition of urea leading to formation of solid urea deposits on the surfaces of the aftertreatment system. Such deposits can further lower temperature of the walls on which such deposits leading to even more urea deposits. Formation, growth and depletion of deposits are influenced by operating parameters of the aftertreatment system including exhaust gas flow rate, exhaust gas temperature, ambient temperature, exhaust fluid spray characteristics and injection rate, and design parameters.

The urea deposits can adversely affect system performance by increasing the engine back pressure. Certain exhaust aftertreatment components, such as vanadium-based catalysts, can be particularly sensitive to such deposits. Such deposits can trigger diagnostic error codes, deactivate exhaust aftertreatment components, and/or increase backpressure experienced by the exhaust gas thereby, degrading the performance of conventional SCR aftertreatment systems.

SUMMARY

Embodiments described herein relate generally to exhaust aftertreatment systems for use with internal combustion (IC) engines and in particular to exhaust aftertreatment systems that include flow modification. In some embodiments, a selective catalytic reduction (SCR) system includes a decomposition chamber which includes an intake chamber and an intermediate chamber. The intake chamber defines an inlet and an internal volume. The intake chamber is configured to receive an intake flow of exhaust gas via the inlet. The system also includes a substrate section which includes at least one catalyst formulated to selectively reduce the exhaust gas, and an outlet to expel the reduced exhaust gas. An injection port is disposed on a wall of the intake chamber and is configured to inject a fluid into the internal volume. A swirl generating plate is disposed in the internal volume proximate to the inlet. The swirl generating plate includes a curved sidewall having a first end and a second end. The first end has a first width and the second end has a second width which is larger than the first width. The first end defines an opening. The curved sidewall is oriented substantially normal to the direction of the intake flow and a convex surface of the curved sidewall is oriented to face the direction of the intake flow.

The swirl generating plate is configured to divide the intake flow into a first flow portion, a second flow portion, and a third flow portion. The first flow portion flows through the opening towards the injection port. The second and the third flow portions are directed substantially normal to the direction of the intake flow and substantially normal to a direction of flow of the first flow portion along the convex surface of the curved sidewall. Furthermore, the second flow portion and the third flow portions are directed in opposing directions to each other and towards a back wall of the intake chamber so as to create opposing swirls in the internal volume. The fluid is directed towards a merging point of the opposing swirls. Moreover, the intermediate chamber is configured to direct the flow of the exhaust gas from the intake chamber towards the substrate section.

In some embodiments, an apparatus for aftertreatment of an exhaust gas includes an intake chamber. The intake chamber defines an inlet and an internal volume, and is configured to receive an intake flow of exhaust gas via the inlet. An injection port is disposed on a wall of the intake chamber and is configured to communicate a fluid into the internal volume. A swirl generating plate is disposed in the internal volume defined by the intake chamber proximate to the inlet. The swirl generating plate includes a curved sidewall having a first end that has a first width and a second end that has a second width larger than the first width. The first end defines an opening. The curved sidewall is oriented substantially normal to a direction of the intake flow. A convex surface of the curved sidewall is oriented to face the direction of the intake flow. The swirl generating plate is configured to divide the intake flow impinging on the curved sidewall into a first flow portion, a second flow portion, and a third flow portion. The first flow portion flows through the opening towards the injection port. The second flow portion and the third flow portion are directed substantially normal to the direction of the intake flow, and substantially normal to a direction of flow of the first flow portion along the convex surface of the curved sidewall. Furthermore, the second flow portion and the third flow portion are directed in opposing directions towards a backwall of the intake chamber so as to create opposing swirls in the internal volume.

In further embodiments, a swirl generating plate for use in an aftertreatment component includes a curved sidewall. The swirl generating plate is configured to be positioned within an intake chamber of the aftertreatment component substantially normal to a direction of an intake flow of an exhaust gas. The curved sidewall includes a first end and a second end. The first end has a first width and the second end has a second width larger than the first width. The first end defines an opening. The swirl generating plate is configured to divide an intake flow of an exhaust gas impinging on a convex surface of the curved sidewall into a first flow portion, a second flow portion, and a third flow portion The first flow portion is directed through the opening. The second flow portion and the third flow portion are directed substantially normal to a direction of the intake flow, and substantially normal to a direction of flow of the first flow portion along the convex surface of the curved sidewall such that the second flow portion and the third flow portion are in opposing directions.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Figure 1:
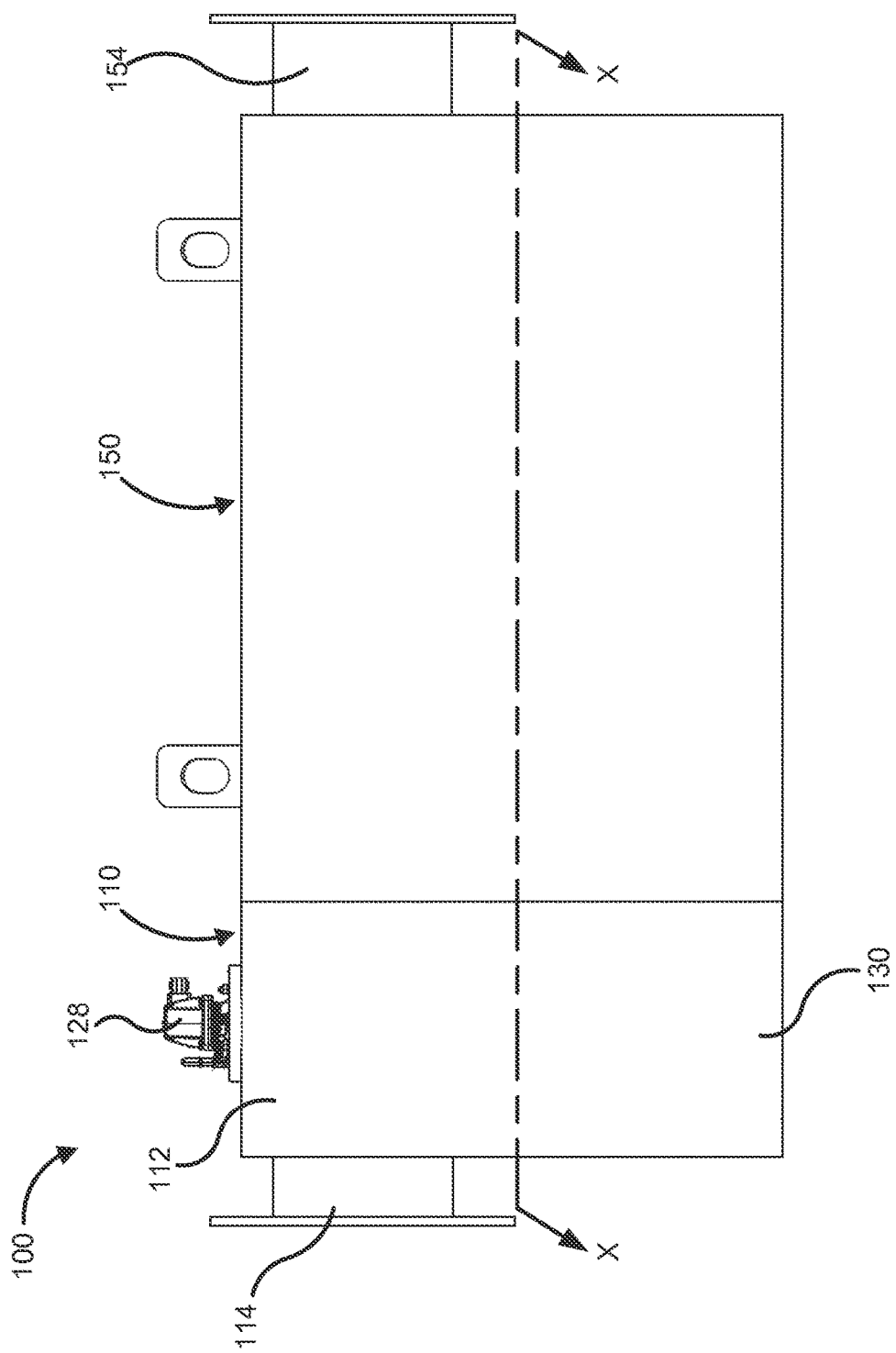
FIG. 1 is a side view of a selective catalytic reduction system that includes a decomposition section and a substrate section, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to exhaust aftertreatment systems for use with internal combustion (IC) engines and in particular to exhaust aftertreatment systems that include flow modification mechanisms therein. Particularly, embodiments described herein describe Selective Catalytic Reduction (SCR) aftertreatment systems that include a swirl generating plate to modify exhaust gas flow. Embodiments described herein may provide several advantages over conventional SCR aftertreatment treatment systems including, for example: (1) reducing urea deposits in the components of the SCR system to near zero levels; (2) minimizing recirculation of the injected urea to prevent nozzle deposits; (3) increasing temperature of sidewalls of a decomposition section of the SCR system further minimizing urea deposits; (4) increasing shear force exerted by the exhaust gas on the sidewalls of an intake chamber included in the decomposition section reducing urea deposits; (5) increasing residence time of the exhaust gas in the intake chamber thereby, increasing mixing efficiency of the exhaust gas with the urea; (6) reducing tailpipe $NH_3$ slip; (7) allowing modification of the size of the swirl generating plate such that the swirl generating plate can be used with any conventional SCR aftertreatment system, and; (8) providing flow modification and also meeting backpressure requirements thereby, preventing any adverse effects on fuel economy.

Figure 2:
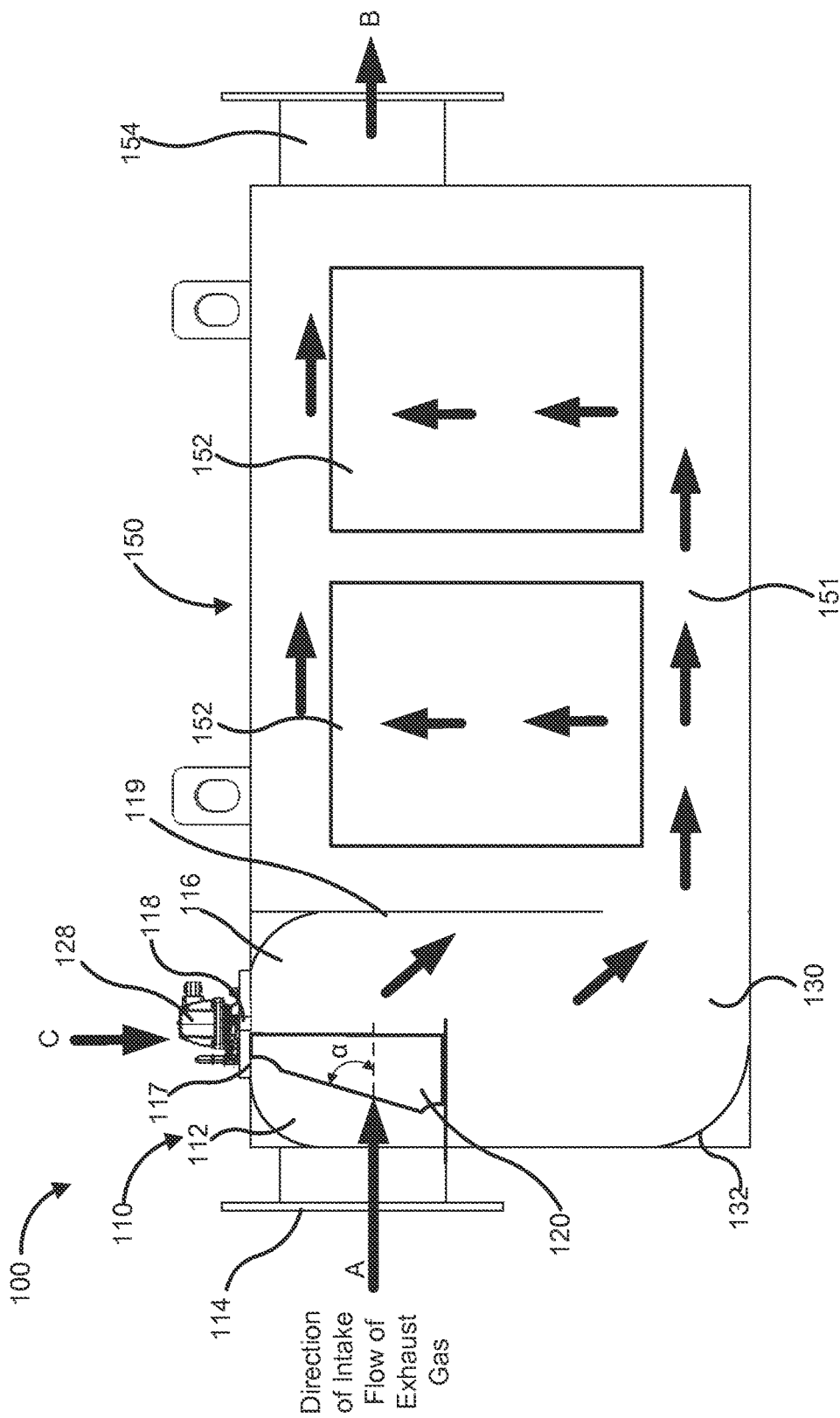
FIG. 2 is a side cross-section view of the selective catalytic reduction system of FIG. 1, taken along the line XX as shown in FIG. 1.
Figure 3:
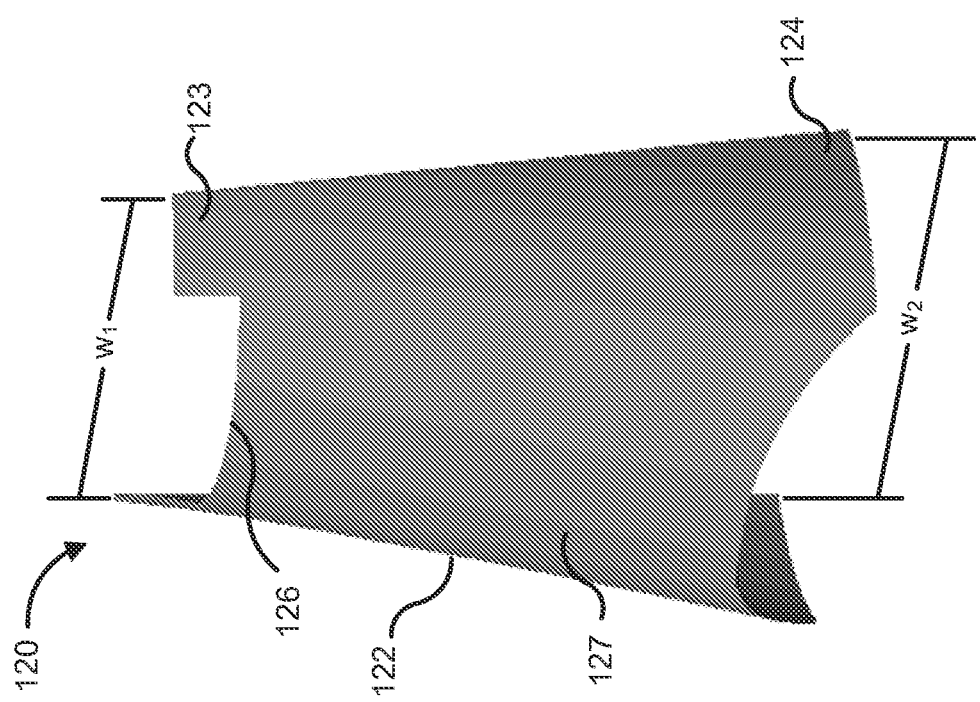
FIG. 3 is a perspective view of a swirl generating plate (also referred to herein as "bluff") disposed within an intake chamber of the selective catalytic reduction system of FIG. 2.

Referring to FIGS. 1-2, a selective catalytic reduction (SCR) system 100 includes a decomposition section 110 and a substrate section 150. The SCR system 100 can be used for aftertreatment of exhaust gases, for example, exhaust gases produced from an IC engine such as a diesel engine, and substantially reduce the NOx emissions of the exhaust gas.

As shown in FIG. 2, the decomposition section includes an intake chamber 112 and an intermediate chamber 130. The intake chamber 112 defines an inlet 114 and an internal volume 116. The intake chamber 112 is configured to receive an intake flow of an exhaust gas, for example, a diesel exhaust gas, via the inlet 114 in a direction shown by the arrow A. An injection port 118 is disposed on a wall 117 of the intake chamber 112, and is configured to inject a fluid into the internal volume 116 in a direction shown by the arrow C. The injection port 118 can include one or more nozzles, or any other components configured to facilitate the injection or insertion of the fluid into the internal volume 116 received from a source of the fluid via a fluid injector 128 (FIG. 1). In some embodiments, the fluid can include a diesel exhaust fluid. In more particular embodiments, the diesel exhaust fluid comprises urea. In some embodiments, the diesel exhaust fluid can include any other fluid that includes ammonia, by products, or any other diesel exhaust fluid as is known in the arts (e.g., the diesel exhaust fluid marked under the name ADBLUE®).

A swirl generating plate 120 is disposed in the internal volume 116 defined by the intake chamber 112 proximate to the inlet 114. As shown in FIGS. 3-6, the swirl generating plate 120 includes a curved sidewall 122 having a first end 123 and a second end 124. The first end 123 has a first width $w_1$ and the second end 124 has a second width $w_2$ larger than the first width $w_1$. In other words, the swirl generating plate 120 resembles a half shell of a truncated cone, or otherwise frustum. The first width $w_1$ and the second width $w_2$ can be varied such that the swirl generating plate 120 can be disposed in the intake chamber of any SCR system having any size. In some embodiments, the first width $w_1$ and the second width $w_2$ can have the same dimensions. In other embodiments, a length of the swirl generating plate 120 measured as a distance between the first end 123 and the second end 124 can also be varied to optimize swirl generation.

Figure 4:
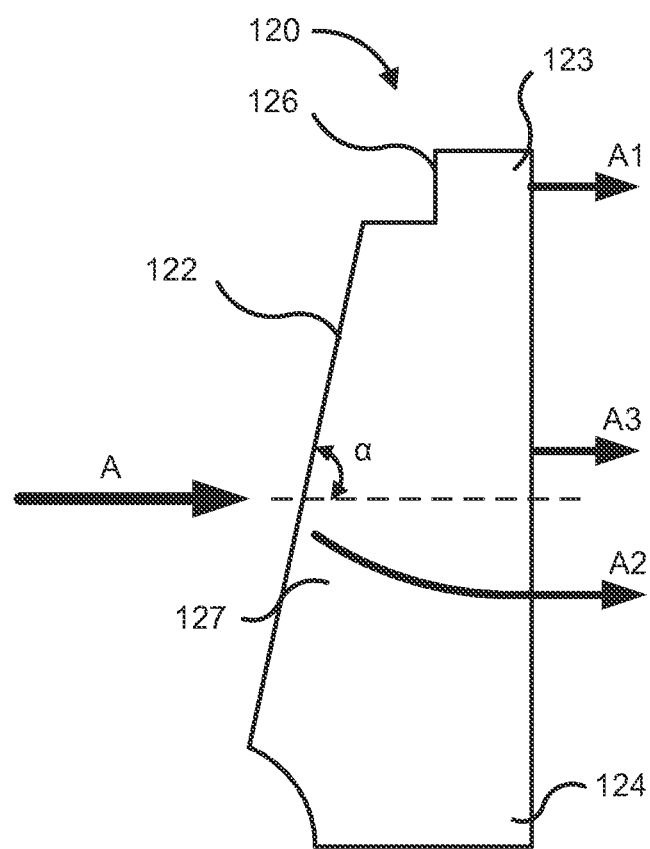
FIG. 4 is a side view of the swirl generating plate of FIG. 3.

The first end 123 of the bluff 120 defines an opening 126. While shown in FIG. 3 as being a rectangular opening, the opening 126 can have any shape or size such as. For example, the opening 126 can possess a square, circular, elliptical, or oval shape. While shown as including a single opening 126, in some embodiments, the first end 123 can define multiple openings. As shown in FIGS. 2 and 4, the curved sidewall 122 of the swirl generating plate 120 is disposed substantially normal to the direction of the intake flow A, such that a convex surface 127 of the curved sidewall 126 is oriented to face the direction of the intake flow A. Furthermore, the curved sidewall 122 is inclined at a non-zero angle $\alpha$ with respect to the direction of intake flow A. The angle $\alpha$ can be any suitable angle such as, for example, about 45 degrees, 50 degrees, 55 degrees, 60 degrees, 65 degrees, 70 degrees, 75 degrees, 80 degrees, or about 85 degrees, inclusive of all ranges and values therebetween. Moreover, the curved sidewall 122 subtends an arc angle $\beta$ of about 180 degrees. In some embodiments, the arc angle $\beta$ subtended by the curved sidewall 122 can be any suitable arc angle such as, for example, about 140 degrees, 150 degrees, 160 degrees, 170 degrees, 180 degrees, 190 degrees, 200 degrees, 210 degrees, or about 220 degrees, inclusive of all ranges and values there between.

Figure 5:
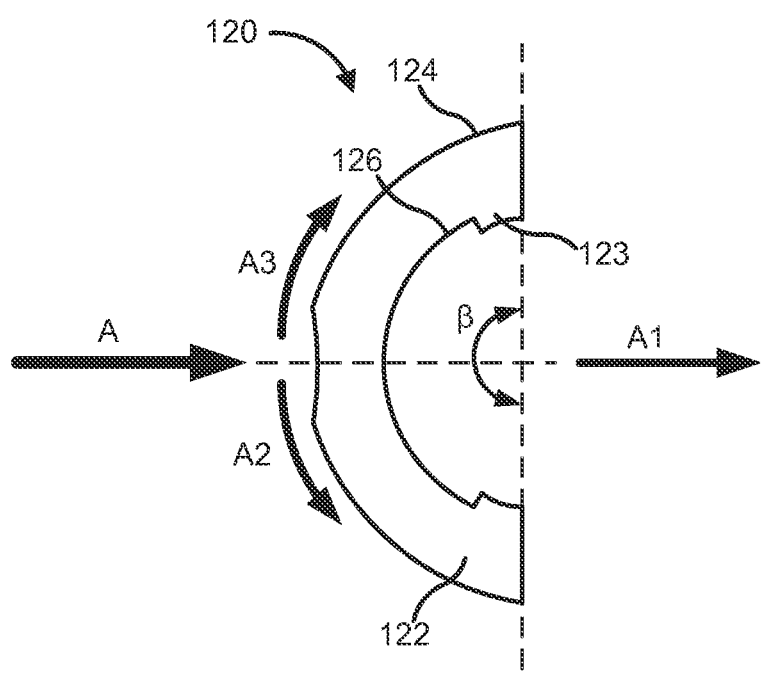
FIG. 5 is a top view of the swirl generating plate of FIG. 3.

As shown in FIGS. 4 and 5, the swirl generating plate 120 is configured to divide the intake flow A impinging on the curved sidewall into a first flow portion A1, a second flow portion A2, and a third flow portion A3. The first flow portion A1 flows through the opening 126 towards the injection port 117. The first flow portion A1 can exert a shear force on the sidewall 117 of the intake chamber 112 on which the injection port 118 is mounted. The shear force can shear off any deposit of the fluid from the sidewall 117 and/or reduce the recirculation of the exhaust gas and fluid (e.g., urea) mixture which can also reduce fluid deposition (e.g., urea deposition) proximate to the injection port 118, for example, on a nozzle of the injection port 118, or on the sidewall 117.

The second flow portion A2 and the third flow portion A3 are directed substantially normal to the direction of the intake flow A (FIGS. 4 and 5), and substantially normal to a direction of flow of the first flow portion A1 along the convex surface 127 of the curved sidewall 122. Furthermore, the second flow portion A2 and the third flow portion A3 are directed in opposing directions to each other and towards a back wall 119 of the intake chamber 112 so as to create opposing swirls in the internal volume 116. The opposing swirls can merge together at a merging point within the internal volume 116 such that the fluid (e.g., urea) communicated through the injection port 118 is directed towards a merging point of the opposing swirls. This can facilitate or otherwise enhance the mixing of the fluid, for example, urea with the exhaust gas. This can, for example, enhance a reduction of one or more gases included in the exhaust gas, for example, the reduction of NOx gases included in the exhaust gas (e.g., diesel engine exhaust gas).

The first flow portion A1 can also be redirected by the backwall 119 of the intake chamber 112 towards the merging point of the opposing swirls, which can further enhance mixing and/or reduce deposition of the fluid, for example, urea on the backwall 119, components or otherwise parts of the SCR system 100. For example, in some embodiments, a quantity of urea deposited on at least one of the injection port 118 and the backwall 119 can be close to near zero levels. In some embodiments, the quantity of urea deposited on one or more catalysts 152 disposed in the substrate section 150, as described herein, is reduced, for example, to be about zero. Reduction in urea deposits within the components of the SCR system 100 can prevent the system 100 from getting clogged thereby, preventing any increase in backpressure experienced by the exhaust gas flowing through the SCR system 100. Such an increase in backpressure can decrease the fuel efficiency of the IC engine (e.g., a diesel engine) coupled to the SCR system. In other words, the SCR system 100 prevents abnormal increase in backpressure experienced by the exhaust gas by reducing or otherwise eliminating urea deposits on the components of the SCR system 100 thereby, reducing any adverse effects on the fuel economy of the IC engine coupled to the SCR system 100. In other words, the back pressure experienced by the exhaust gas does not affect the fuel economy of the engine.

Furthermore, the flow modification of the exhaust gas within the intake chamber 118 using the swirl generating plate 120 does not impact the overall flow characteristics of the exhaust gas through the SCR system 100, such that the flow characteristics (e.g., flow split, flow distribution index, uniformity index, etc. as are commonly known in the arts) to the catalysts 152 disposed in the substrate section 150 are as desired.

The intermediate chamber 130 is fluidly coupled to the intake chamber 112 and the substrate section 150. The intermediate chamber 130 is configured to direct the flow of the exhaust gas from the intake chamber 112 towards the substrate section 150. For example, as shown in FIG. 2, the intermediate chamber 130 includes a deflector 132 which can, for example, include a curved plate, configured to redirect the flow of the exhaust gas towards the substrate section 150.

The substrate section 150 includes at least one catalyst formulated to selectively reduce the exhaust gas. The substrate section 150 defines an internal volume 151 within which a plurality of catalysts 152 are disposed. The exhaust gas can flow over and about the catalyst 152 such that any NOx gas included in the exhaust gas are further reduced to yield an exhaust gas which is substantially free of carbon monoxide, and NOx gases. The substrate section 150 also includes an outlet 154 configured to expel the reduced exhaust gas into the environment.

Computational Fluid Dynamic Simulations

Computational Fluid Dynamic (CFD) analysis was performed to determine gas flow profile about a modeled swirl generating plate disposed within an intake chamber. The CFD analysis focused on thickness and mass of a film of a fluid (e.g., urea) communicated from an injection port disposed on a sidewall of the intake chamber that can get disposed on a wall (e.g., a backwall or the sidewall on which the injection port is disposed) of the intake chamber. The swirl generating plate and the intake chamber were modeled to be substantially similar to the swirl generating plate 120 and the intake chamber 112, as described herein. The CFD modeling was performed using FLUENT® software provided by ANSYS, Inc.

Figure 6:
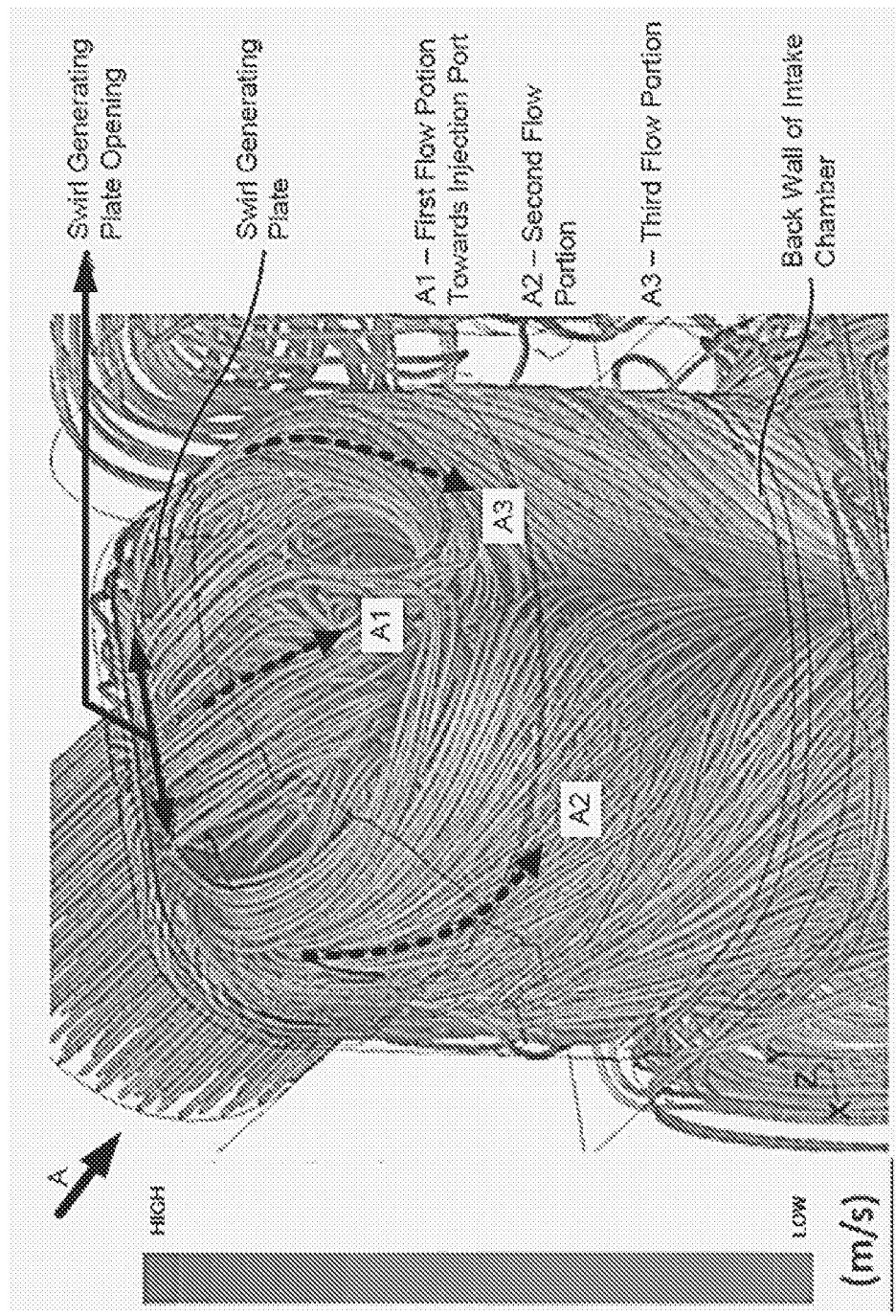
FIG. 6 shows a flow profile of an exhaust gas about the swirl generating plate of FIG. 3 obtained using computational fluid dynamics (CFD), as viewed from an internal volume of the intake chamber of the selective catalytic reduction system of FIG. 1
Figure 7:
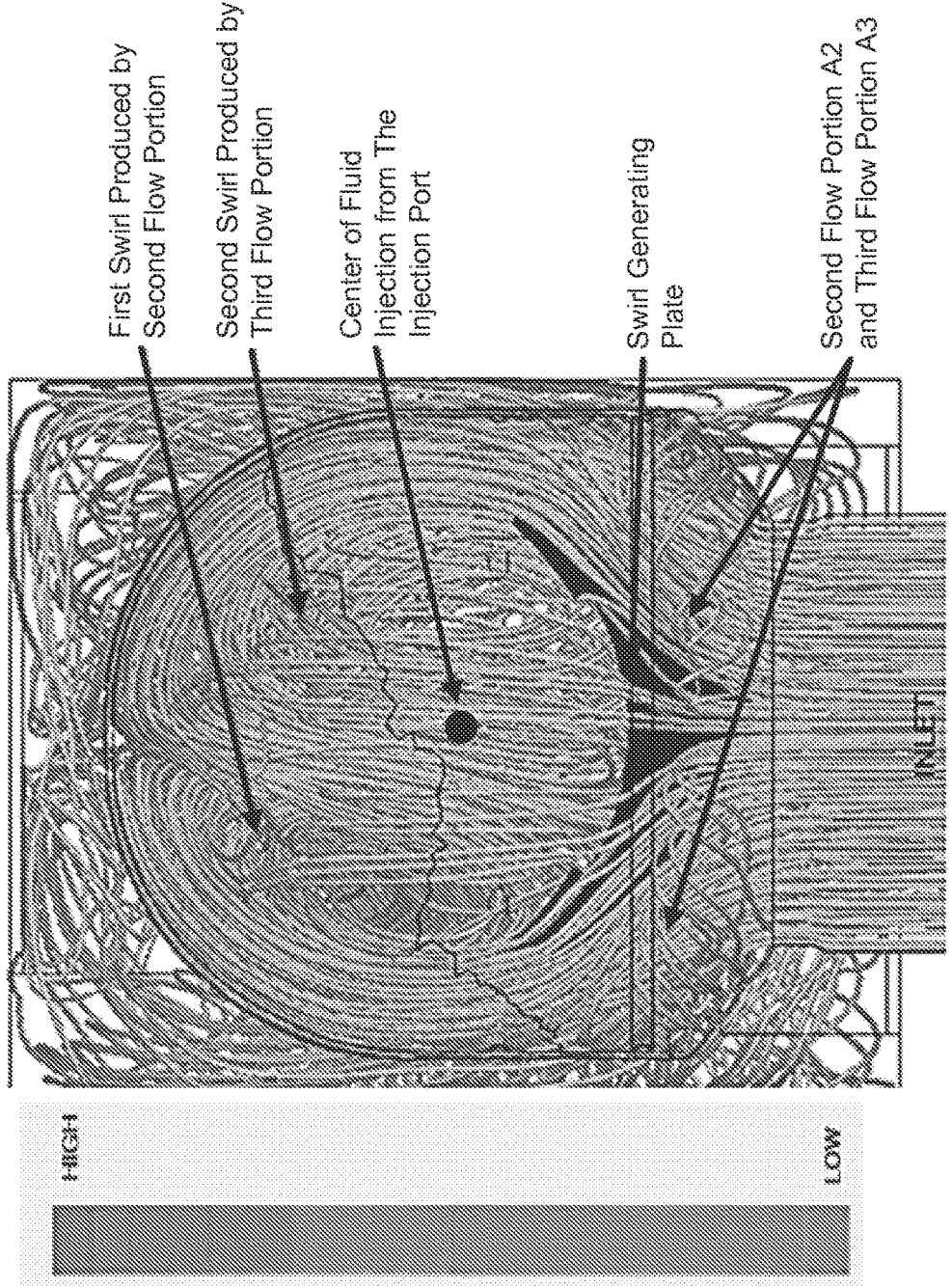
FIG. 7 shows the flow profile of FIG. 6 as viewed from an injection port disposed on a sidewall of the intake chamber of the selective catalytic reduction system.

FIGS. 6 and 7 shows the results obtained using the CFD model. The direction of intake flow of the exhaust gas was in the direction shown by the arrow A and the flow rate of the intake flow was XX m/s. As seen in FIGS. 6 and 7, the first flow portion A1 flows through the opening towards an injection port (not shown). The second flow portion A2 and the third flow portion A3 are directed substantially normal to the direction of the intake flow and substantially normal to the direction of the first flow portion A1 along the convex surface of the curved sidewall of the swirl generating plate. Furthermore, the second flow portion A2 and the third flow portion A3 are directed in opposing direction to each other and towards a backwall of the intake chamber. The second flow portion A2 produces a first swirl, and the third flow portion A3 produces a second swirl such that the first swirl and the second swirl are in opposite directions (i.e., opposing swirls). The first swirl and the second swirl merge at a merging point as shown in FIG. 7 and the fluid is injected from the injection port into the intake chamber such that a center line of the flow path defining the direction of flow of the fluid passes through the merging point. Furthermore, the first flow portion A1 is redirected by the backwall of the intake chamber towards the merging point of the opposing swirls. The mass and the thickness of the fluid film deposited on the walls of the intake chamber as determined by the CFD analysis was substantially reduced relative to intake chambers that did not include the swirl generating plate.

Finite Element Analysis (FEA) was performed to structurally validate an SCR system which included the swirl generating plate for 20,000 hours of useful life. Power Spectral Density (PSD) was performed to determine fatigue, and the fatigue damage factor was determined to be below 1.

Urea Deposit Testing

To observe the impact of the swirl generating plate on urea deposits within an SCR system, a conventional SCR system (referred to herein as the "Delta P 4000 SIEO baseline system" or the "baseline SCR system"), and a test SCR system (referred to herein as the "bluff body system" was compared at a combination of different exhaust temperatures, flow rates and urea injection rates. The amount of urea deposits in each of the systems was then observed. The bluff SCR system was substantially similar to the SCR system 100 described herein and included a swirl generating plate. The baseline SCR system was substantially similar to the bluff SCR system with the exception that the baseline SCR system did not include the swirl generating plate. The amount of urea deposited within the components of each system was observed visually after completion of a steady state test cycle.

Figure 8A:
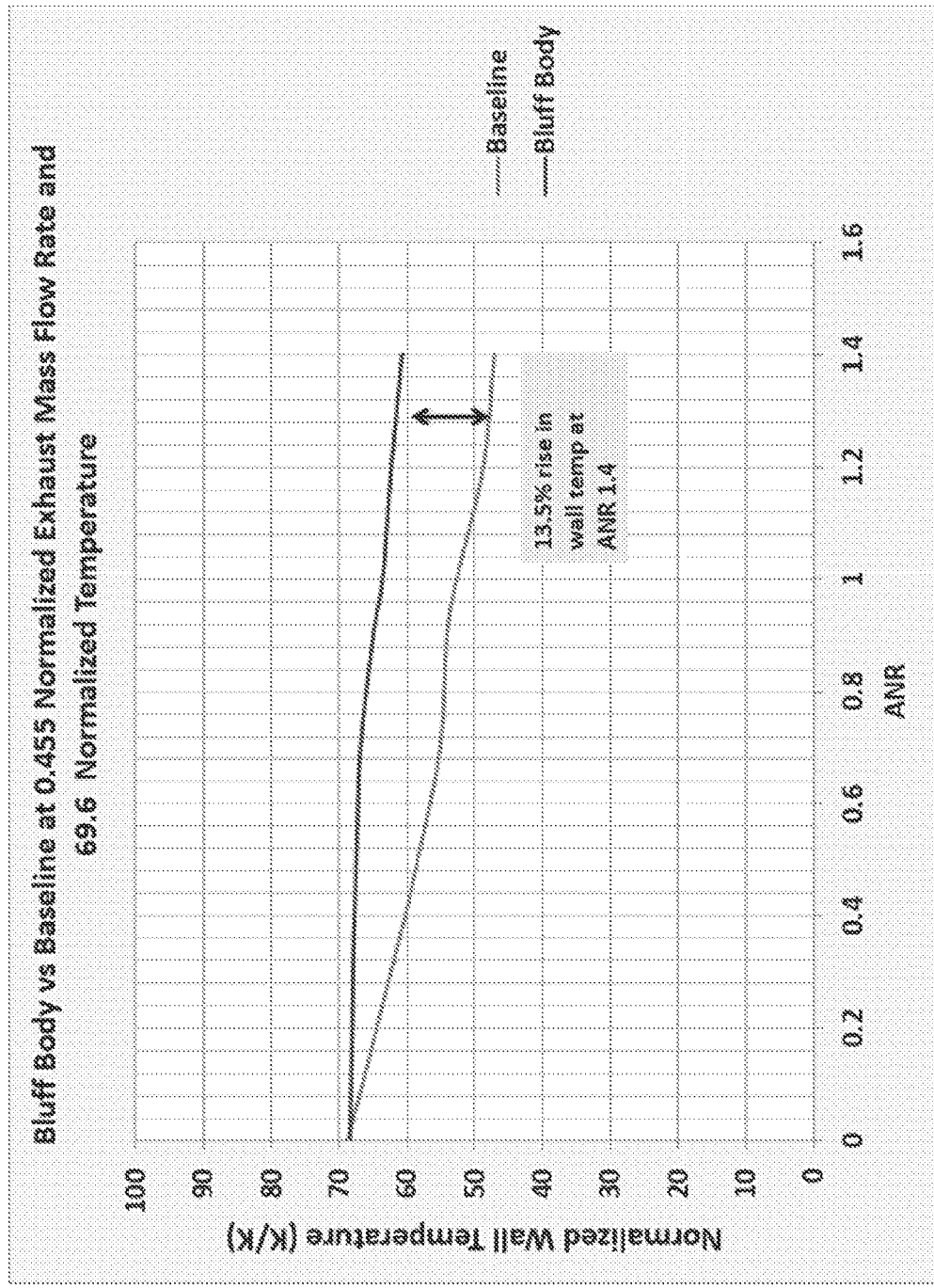
FIGS. 8A and 8B show back wall temperatures between a baseline and the bluff body at different normalized flow conditions.
Figure 8B:
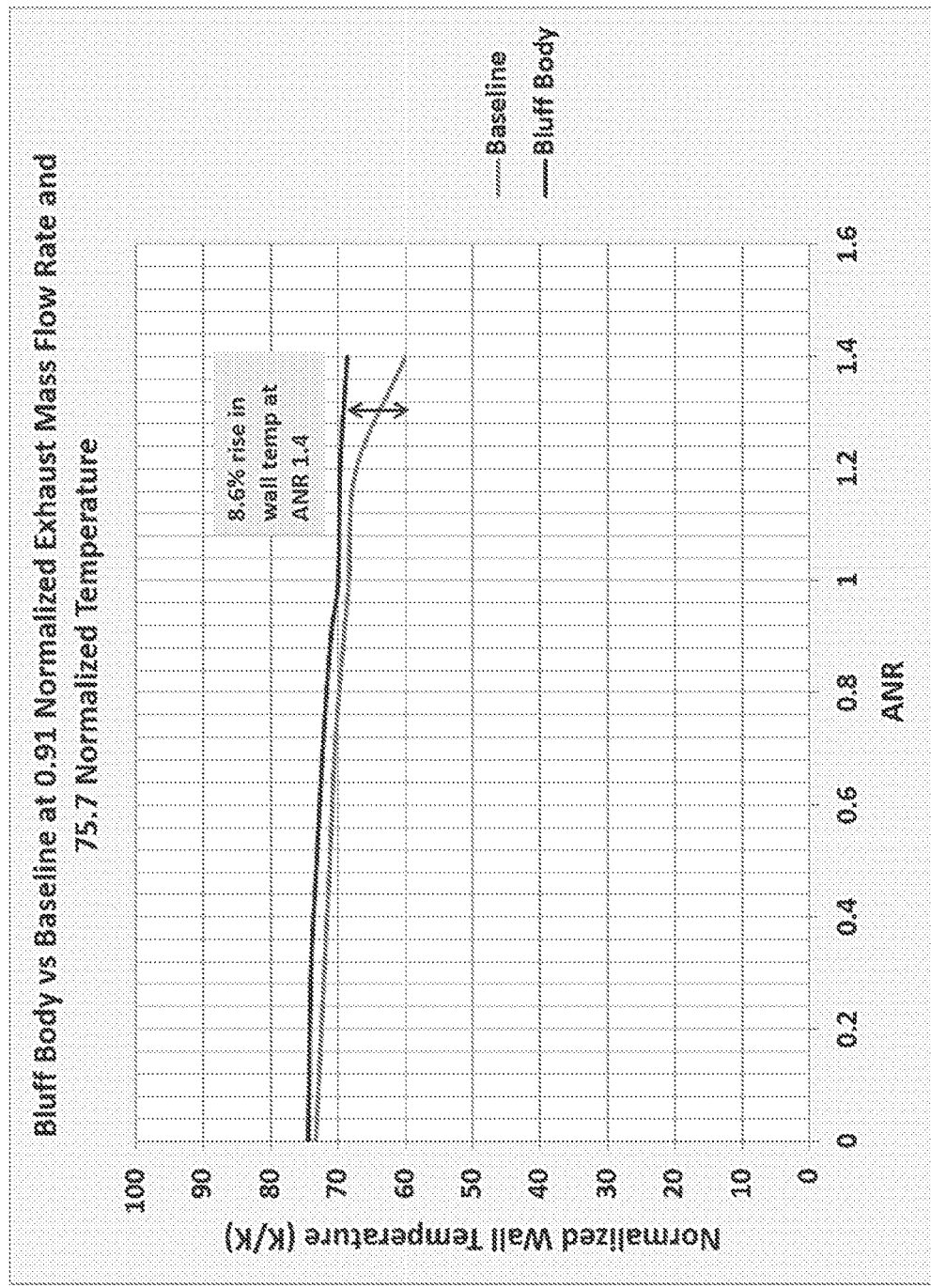
Figure 8C:
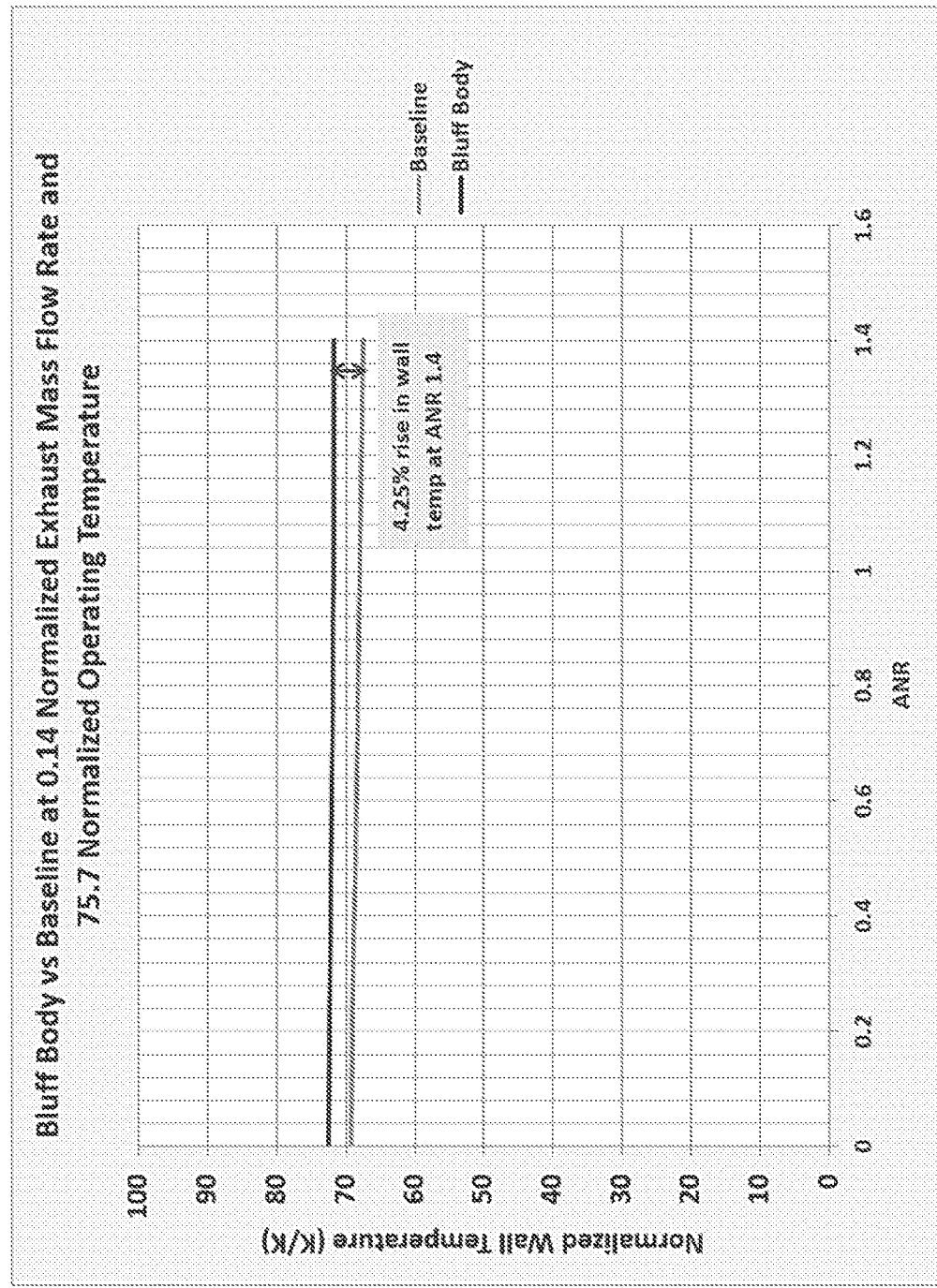
FIG. 8C shows a urea deposits reduction strategy by maintaining a temperature difference between exhaust gas and wall temperature.

As shown in FIGS. 8A, 8B and 8C, significant improvement in back wall temperatures were noticed in the bluff body design as compared to baseline. A multiplicity of thermocouples are placed in a methodical fashion on the back wall of the intake chamber configured to estimate intake chamber temperature. Improvement in back wall temperatures means better mixing of exhaust flow and a diesel exhaust fluid (DEF) which implies lower risk of deposit formation. Bluff body design showed up to a 42.3 (K/K) rise in normalized wall temperature as compared to a baseline SCR system at a given temperature, flow and DEF dosing rate, which indicates that the bluff body design allows a better swirl of the exhaust mixture hence preventing "cold spot sites" which is the initiating point for deposits formation.

Figure 9:
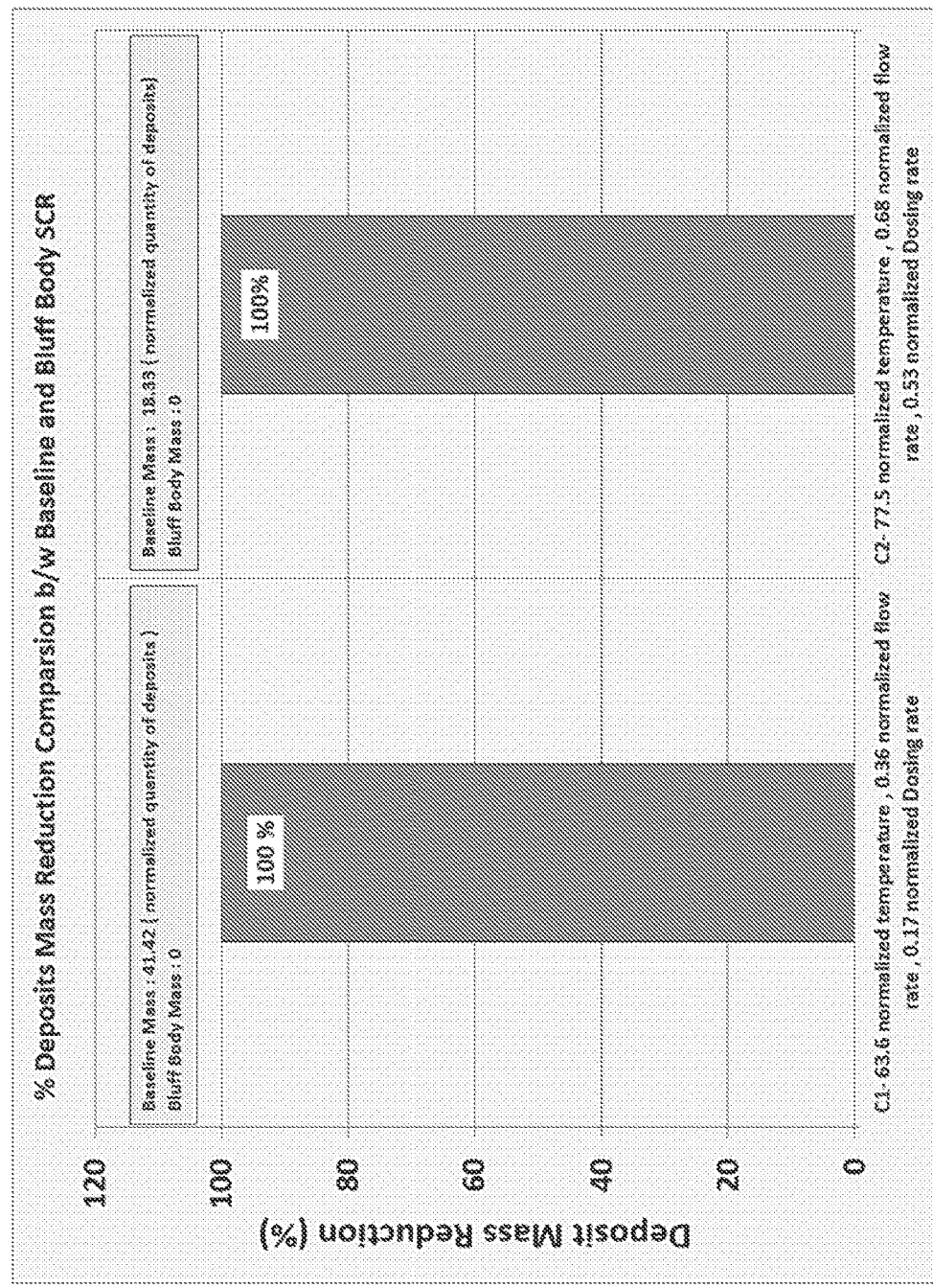
FIG. 9 shows a comparison of normalized urea deposit at multiple normalized flow conditions between the baseline and the bluff body design.

FIG. 9 shows a percentage reduction in deposit mass in the bluff body SCR system as compared to baseline. It can be seen that during steady state testing (10 hours duration), a 100% reduction in deposits formation was noticed at the same boundary conditions as compared to baseline. Furthermore, no amount of urea deposits could be visually observed on the plate or on the sidewalls of an intermediate chamber (also referred to herein as the "bottom chamber") of the bluff SCR system. This shows that the bluff SCR system that includes the swirl generating plate has very little or no deposition of urea in the bluff body SCR system which can increase the life of the SCR system.

As used herein, the terms "about" and "approximately" generally mean plus or minus 10% of the stated value. For example, about 0.5 would include 0.45 and 0.55, about 10 would include 9 to 11, about 1000 would include 900 to 1100.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. A selective catalytic reduction system comprising:
   a decomposition section including an intake chamber and an intermediate chamber, the intake chamber comprising a first wall and a second wall opposite the first wall, the intake chamber defining an inlet and an internal volume, the intake chamber configured to receive an intake flow of exhaust gas via the inlet;
   a substrate section including at least one catalyst formulated to selectively reduce the exhaust gas and an outlet to expel the reduced exhaust gas;

an injection port disposed on the first wall, the injection port configured to inject a fluid into the internal volume; and a swirl generating plate disposed in the internal volume proximate to the inlet, the swirl generating plate comprising a curved sidewall having a first end coupled to the first wall and a second end coupled to the second wall, the first end having a first width and the second end having a second width larger than the first width, the first end defining an opening, the curved sidewall oriented normal to a direction of the intake flow, a convex surface of the curved sidewall oriented to face the direction of the intake flow, the swirl generating plate configured to divide the intake flow impinging on the curved sidewall into a first flow portion, a second flow portion, and a third flow portion, the first flow portion flowing through the opening towards the injection port, the second flow portion and the third flow portion directed normal to the direction of the intake flow and normal to a direction of flow of the first flow portion along the convex surface of the curved sidewall, the second flow portion and the third flow portion being in opposing directions to each other and towards a backwall of the intake chamber so as to create opposing swirls in the internal volume, the fluid directed towards a merging point of the opposing swirls;

wherein the intermediate chamber is configured to direct the flow of the exhaust gas from the intake chamber towards the substrate section.

2. The selective catalytic reduction system of claim 1, wherein the curved sidewall is normal to the direction of flow of the exhaust gas.

3. The selective catalytic reduction system of claim 1, wherein the curved sidewall is inclined at a non-zero angle with respect to the direction of the intake flow.

4. The selective catalytic reduction system of claim 1, wherein the first flow portion is redirected by the backwall of the intake chamber towards the merging point of the opposing swirls.

5. The selective catalytic reduction system of claim 1, wherein the exhaust gas is a diesel exhaust gas.

6. The selective catalytic reduction system of claim 1, wherein the first flow portion exerts a shear force on the sidewall of the intake chamber on which the injection port is mounted, the shear force configured to reduce recirculation of the fluid.

7. The selective catalytic reduction system of claim 1, wherein the fluid comprises urea.

8. The selective catalytic reduction system of claim 7, wherein a quantity of urea deposited on at least one of the injection port or the backwall is zero.

9. The selective catalytic reduction system of claim 6, wherein the selective catalytic reduction system is included in an engine configured to generate the exhaust gas, and wherein a back pressure experienced by the exhaust gas does not affect fuel economy of the engine.

10. An apparatus for aftertreatment of an exhaust gas, the apparatus comprising:

an intake chamber comprising a first wall and a second wall opposite the first wall, the intake chamber defining an inlet, and an internal volume, the intake chamber configured to receive an intake flow of exhaust gas via the inlet;

an injection port disposed on the first wall, the injection port configured to communicate a fluid into the internal volume; and a swirl generating plate disposed in the internal volume defined by the intake chamber proximate to the inlet, the swirl generating plate comprising a curved sidewall having a first end coupled to the first wall and a second end coupled to the second wall, the first end having a first width and the second end having a second width larger than the first width, the first end defining an opening, the curved sidewall oriented normal to a direction of the intake flow, a convex surface of the curved sidewall oriented to face the direction of the intake flow, the swirl generating plate configured to divide the intake flow impinging on the curved sidewall into a first flow portion, a second flow portion, and a third flow portion, the first flow portion flowing through the opening towards the injection port, the second flow portion and the third flow portion directed normal to the direction of the intake flow and normal to a direction of flow of the first flow portion along the convex surface of the curved sidewall, the second flow portion and the third flow portion being in opposing direction towards a backwall of the intake chamber so as to create opposing swirls in the internal volume.

11. The apparatus of claim 10, wherein the curved sidewall is inclined at a non-zero angle with respect to the direction of the intake flow.

12. The apparatus of claim 10, wherein the fluid is injected via the injection port towards a merging point of the opposing swirls.

13. The apparatus of claim 10, wherein the exhaust gas is a diesel exhaust gas.

14. The apparatus of claim 10, wherein the first flow portion exerts a shear force on the sidewall of the intake chamber on which the injection port is mounted, the shear force configured to reduce recirculation of the fluid.

15. The apparatus of claim 10, wherein the fluid includes a diesel exhaust fluid.

16. The apparatus of claim 15, wherein the diesel exhaust fluid is urea.

17. The apparatus of claim 16, wherein no urea is deposited on at least one of the injection port or the backwall.

18. The apparatus of claim 15, wherein the apparatus comprises:

a catalyst fluidly coupled to the intake chamber and structured to receive a mixture of the intake flow and the fluid from the intake chamber;

wherein a back pressure experienced by the exhaust gas does not affect performance of the catalyst.

19. A swirl generating plate for use in an aftertreatment component, the swirl generating plate comprising:

a curved sidewall configured to be positioned within an intake chamber of the aftertreatment component normal to the direction of an intake flow of an exhaust gas, the curved sidewall having a first end and a second end, the first end having a first width and the second end having a second width larger than the first width, the first end defining an opening;

wherein the swirl generating plate is configured to divide an intake flow of an exhaust gas impinging on a convex surface of the curved sidewall into a first flow portion, a second flow portion, and a third flow portion, the first flow portion directed through the opening, the second flow portion and the third flow portion directed normal to a direction of the intake flow and normal to a direction of flow of the first flow portion along the convex surface of the curved sidewall, the second flow portion and the third flow portion being in opposing directions; and wherein the curved sidewall subtends an arc angle of less than 360 degrees.

20. The swirl generating plate of claims 19, wherein the convex surface of the curved sidewall is oriented normal to the direction of the intake flow.

21. The swirl generating plate of claim 19, wherein the curved sidewall is inclined at a non-zero angle with respect to the direction of the intake flow.

22. The swirl generating plate of claim 21, wherein the angle between the curved sidewall and the direction of the intake flow is in the range of 45 degrees to 85 degrees.

23. The swirl generating plate of claim 19, wherein the opening is at least one of square, circular, elliptical, oval, or rectangular.

24. The swirl generating plate of claim 19, wherein the arc angle is less than or equal to 220 degrees.

* * * * *